United States Patent
Yoshida et al.

[11] 3,903,101
[45] Sept. 2, 1975

[54] METHOD OF PREPARING AROMATIC TETRACARBOXYLIC ACIDS CONTAINING OXADIAZOLE RING OR DI-ANHYDRIDES THEREOF

[75] Inventors: Kazuaki Yoshida; Hideo Sekiguchi, both of Yokohama; Hiroshi Shimizu, Osaka; Katsuyoshi Hirasa, Yokohama; Noriyoshi Okubo, Hiratsuka, all of Japan

[73] Assignee: The Furakawa Electric Company Ltd., Tokyo, Japan

[22] Filed: Jan. 3, 1974

[21] Appl. No.: 430,523

[30] Foreign Application Priority Data
Jan. 12, 1973  Japan.................................. 48-6392
June 12, 1973  Japan............................... 48-66026

[52] U.S. Cl.......... 260/307 G; 260/515 R; 260/517; 260/520; 260/558 H; 260/559 H
[51] Int. Cl.²...................................... C07D 271/10
[58] Field of Search............................. 260/307 G

[56] References Cited
UNITED STATES PATENTS
2,765,304  10/1956  Siegrist et al. ...................... 260/240
2,845,419  7/1958  Siegrist et al. ...................... 260/240

FOREIGN PATENTS OR APPLICATIONS
28,779  9/1970  Japan
916,560  1/1963  United Kingdom

*Primary Examiner*—Raymond V. Rush
*Attorney, Agent, or Firm*—Kemon, Palmer & Estabrook

[57] ABSTRACT

A method of preparing aromatic tetracarboxylic acids containing oxadiazole ring expressed by the general formula:

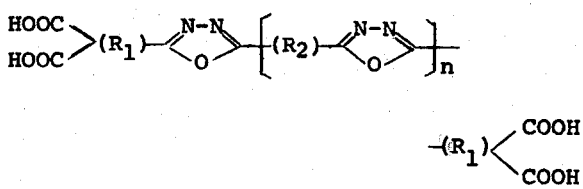

or di-anhydrides thereof
where:
n = an integer of from 0 to 1
$R_1$ = a member selected from the group consisting of the following radicals:

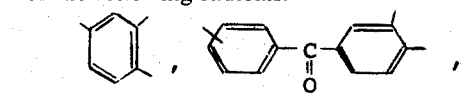

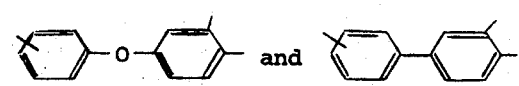

$R_2$ = a member selected from the group consisting of the following radicals:

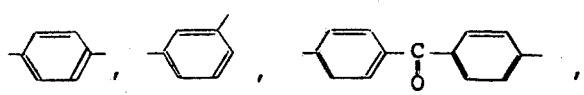

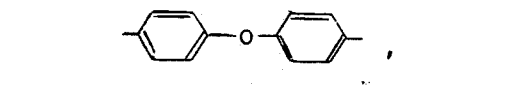

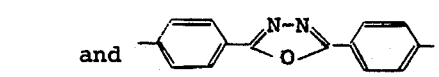

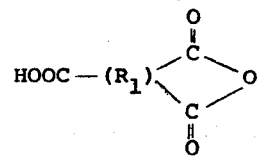

which comprises reacting tricarboxylic anhydrides expressed by the general formula:

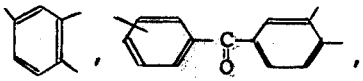

where:
$R_1$ = a member selected from the group consisting of the following radicals:

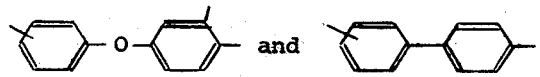

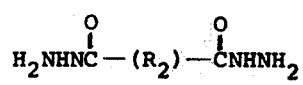

an hydrazine or dihydrazides expressed by the general formula:

$$H_2NHNC-(R_2)-CNHNH_2$$
(with C=O groups)

where:
$R_2$ = a member selected from the group consisting of the following radicals:

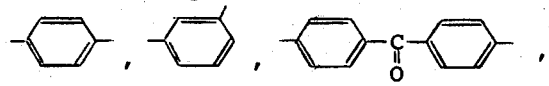

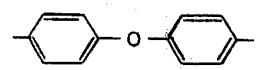

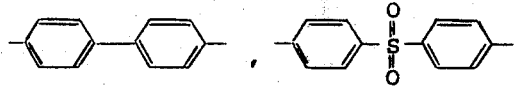

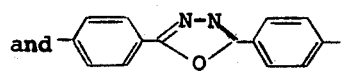

or the salts thereof at a higher temperature than 60°C in fuming sulfuric acid containing more than 40 per cent by weight of free $SO_3$, and thereafter precipitating and separating the reaction product using a substance miscible with the sulfuric acid, but acting as a nonsolvent with respect to said reaction product.

14 Claims, No Drawings

METHOD OF PREPARING AROMATIC TETRACARBOXYLIC ACIDS CONTAINING OXADIAZOLE RING OR DI-ANHYDRIDES THEREOF

This invention relates to a method of preparing aromatic tetracarboxylic acids containing oxadiazole ring expressed by the general formula:

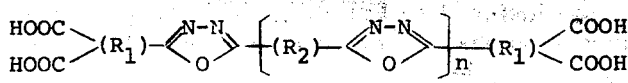

or di-anhydrides thereof
where:
$n$ = an integer of from 0 to 1
$R_1$ = a member selected from the group consisting of the following radicals:

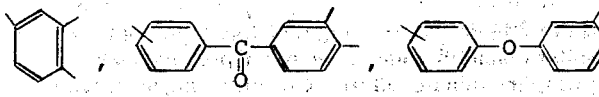

$R_2$ = a member selected from the group consisting of the following radicals:

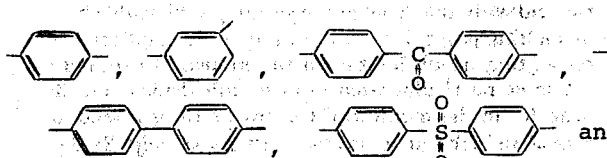

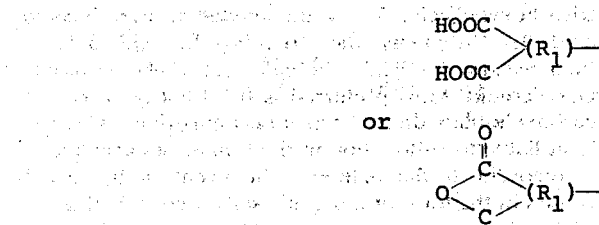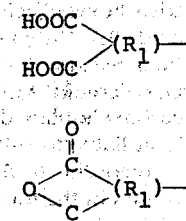

Aromatic tetracarboxylic acids such as pyromellitic acid and benzophenone tetracarboxylic acid and di-anhydrides thereof have been known to be used as a raw material for heat resisting resins such as polyimide and polybenzimidazopyrrolone and for a plasticizer for polyvinyl chloride resin and as a hardening agent for epoxy resin, unsaturated polyester, etc. However, the prior art aromatic tetracarboxylic acids have the drawbacks that they are expensive and even when they are manufactured at a relatively low cost, they are too low in purity to enable products in the above-mentioned applications to display their full properties. The reason is that the raw material of the prior art aromatic tetracarbolylic acids is difficult to procure and expensive, and the process of preparing said acids is accompanied with the danger due to an oxidation reaction taking place during manufacture it is difficult to avoid such danger and moreover the product obtained is expensive and often of low purity.

The present inventors have made studies in view of the above-mentioned shortcomings of the prior art to develop a method of easily preparing aromatic tetracarboxylic acids useful for the aforesaid applications at low cost from readily procurable raw material. As a result, the inventors have accomplished this invention by discovering that the aromatic tetracarboxylic acids containing one or more oxadiazole ring or di-anhydrides thereof respectively expressed by the following general formulas:

 ... (III)

or

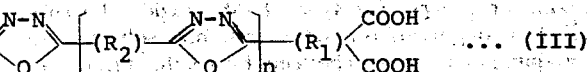

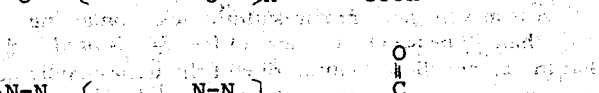 ... (IV)

where: $n$, $R_1$ and $R_2$ denote the same as previously mentioned can be prepared by reacting particular tricarboxylic anhydrides expressed by the general formula:

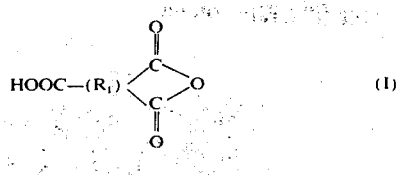 (I)

where:
$R_1$ = a member selected from the group consisting of the following radicals:

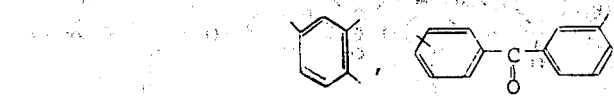 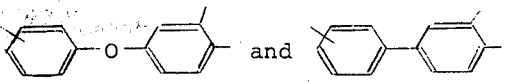

and amino compound selected from the group consisting of hydrazine or particular dihydrazides expressed by the general formula:

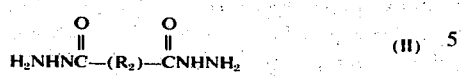

where:

$R_2$ = a member selected from the group consisting of the following radicals:

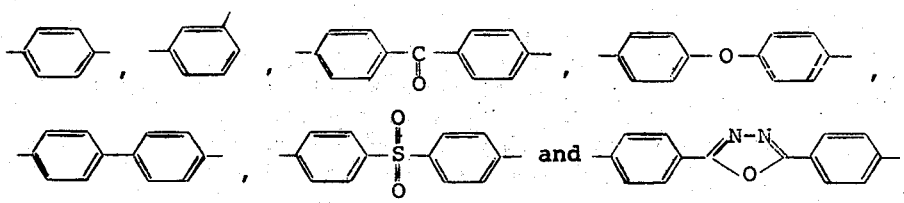

and the salts thereof at a higher temperature than 60°C in fuming sulfuric acid containing more than 40 per cent by weight of free $SO_3$ and thereafter precipitating and separating the reaction product using a substance miscible with the sulfuric acid, but acting as a nonsolvent with respect to said reaction product.

The method of this invention can easily prepare aromatic tetracarboxylic acids or di-anhydrides thereof from readily procurable raw materials such as tricarboxylic anhydrides, hydrazine, dihydrazides, salts of hydrazine and dihydrazides and fuming sulfuric acid by condensation reaction which is safer than oxidation reaction, providing an inexpensive product of high purity and performance useful for the aforesaid applications.

For the method of this invention, it is indispensable that a particular type of tricarboxylic anhydride and hydrazine or a particular type of dihydrazides be subjected to condensation reaction in fuming sulfuric acid containing more than 40 per cent by weight of free $SO_3$. The reason why said fuming sulfuric acid containing more than 40 per cent by weight of free $SO_3$ is used is that the carboxylic anhydride ring of the tricarboxylic anhydride expressed by the general formula (1) remains stable in the solvent of said fuming sulfuric acid and the free carboxyl group carries out condensation reaction exclusively with hydrazine or a particular type of dihydrazides expressed by the general formula (II), providing a desired high purity product, and that where there is used dilute fuming sulfuric acid containing less than 40 per cent by weight of free $SO_3$, then the carboxylic anhydride ring of the tricarboxylic anhydride presents a side reaction with hydrazine or dihydrazides, giving rise to impurities containing compounds expressed by the general formula:

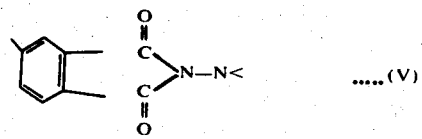

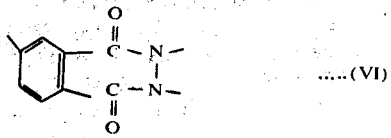

and resulting in a prominent decline in the purity of the product and a low yield. The fuming sulfuric acid used in the method of this invention is preferred to contain 50 to 70 per cent by weight of free $SO_3$. Such fuming sulfuric acid provides a far purer product with a high yield. The fuming sulfuric acid containing more than 40 per cent by weight of free $SO_3$ which is used in the method of this invention can be prepared by mixing commercially available fuming sulfuric acid (containing less than 25 per cent by weight of free $SO_3$) or sulfuric acid with industrial grade sulfuric anhydride (having its melting point raised by addition of a stabilizer), thus presenting no difficulties in the industrial production.

Use of particular tricarboxylic anhydrides and dihydrazides in the method of this invention is intended to provide a high purity product with good yield. Said particular tricarboxylic anhydrides are, for example, anhydrides of 1,2,4-benzene tricarboxylic acid, 3,3',4'-benzophenone tricarboxylic acid, 3,4,4'-benzophenone tricarboxylic acid, 3,3',4'-diphenylether tricarboxylic acid, 3,4,4'-diphenylether tricarboxylic acid, 3,3',4'-biphenyl tricarboxylic acid and 3,3,4'-biphenyl tricarboxylic acid. Most preferred is the 1,2,4-benzene tricarboxylic anhydride (trimellitic anhydride) which is lesat liable to sulfonation in the fuming sulfuric acid.

According to the method of the invention, hydrazine is used in the form of inorganic salts such as hydrazine sulfate, hydrazine phosphate and hydrazine hydrochloride.

Particular dihydrazides are, for example, dihydrazides of terephthalic acid, isophthalic acid, 4,4'-benzophenone dicarboxylic acid, 4,4'-diphenyl ether dicarboxylic acid, 4,4'-biphenyl dicarboxylic acid, 4,4'-diphenyl sulfone dicarboxylic acid and 4,4'-diphenyl-1,3,4-oxadiazole dicarboxylic acid. Most preferred is terephthalic dihydrazide or isophthalic dihydrazide which is hardly sulfonated. Most preferred among the hydrazine and particular dihydrazides are inorganic salts of hydrazine, particularly the sulfate thereof. The reason is that the hydrazine is less liable to sulfonation or polycondensation than the dihydrazides.

The requirement of free $SO_3$ for the condensation reaction used in the method of this invention exceeds the stoichiometric equivalent used in the reactions indicated by the following formulas (VII) and (VIII):

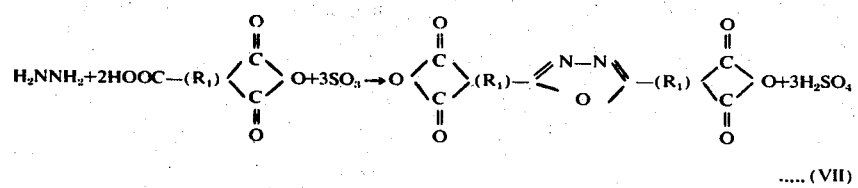

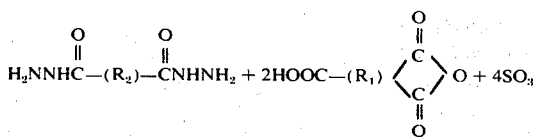

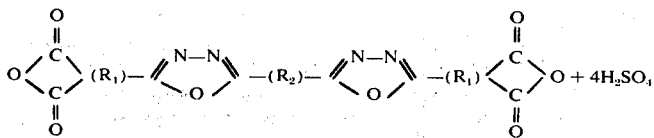

..... (VIII)

where: $R_1$ and $R_2$ denote the same groups as previously mentioned. Namely, more than 3 mols of free $SO_3$ are used per mol of hydrazine and more than 4 mols of free $SO_3$ per mol of dihydrazide. However, only a slightly excess amount of free $SO_3$ is not desired due to the slow progress of reaction. It is therefore preferred to use more than 6 or 8 mols of free $SO_3$ per mol of hydrazine or dihydrazide.

Since the condensation reaction of this invention follows the above-mentioned formulas (VII) and (VIII), tricarboxylic anhydride and hydrazine or dihydrazide may be reacted with each other substantially in the molar ratio of 2:1. To obtain a high purity product, however, by suppressing a side reaction, it is preferred to react tricarboxylic anhydride and hydrazine or dihydrazide in the molar ratio of 1.8:1 to 2.6:1. Particularly where dihydrazide is used, the raw materials should preferably be reacted in the molar ratio of 2.0:1 to 2.4:1 in order to prevent the occurrence of polycondensation through self-condensation.

The condensation reaction used in the method of this invention is carried out at a higher temperature than 60°C, or most preferably at a temperature of 80° to 100°C. For the object of this invention, it is desired that said condensation reaction be effected by first mixing only tricarboxylic acid alone with the fuming sulfuric acid or preferably dissolving the former in the latter and thereafter adding hydrazine or dihydrazide, rather than initially mixing the raw materials at room temperature and thereafter heating the mixture to the required reaction temperature. The reason is that the first mentioned process is effective to suppress polycondensation.

According to the method of this invention, the product of condensation reaction is precipitated using a substance miscible with the sulfuric acid, but acting as a nonsolvent with respect to said product. Said nonsolvent substance is, for example, water including ice (hereinafter simply referred to as "water") or a nonaqueous nonsolvent such as acetone glacial acetic acid and acetic anhydride. Where water is used as a nonsolvent substance, the resultant product is tetracarboxylic acid expressed by the general formula (III). Where a nonaqueous nonsolvent substance is used the product obtained is di-anhydride indicated by the general formula (IV).

When precipitation is carried out by water, the product often takes a viscous paste-like state presenting difficulties in the subsequent treatment. To prevent this drawback, it is desired to mix water and a solution of fuming sulfuric acid containing the reaction product so as to bring the concentration of sulfuric acid to 15 to 45 per cent by weight for precipitation of said product, maintain the resultant suspension at a temperature of 20° to 60°C for longer than 30 minutes and thereafter separate the product. This process has the advantage of preventing the precipitated product from taking a viscous paste-like form, facilitating its separation and water washing, and moreover increasing its yield. It is most preferred to continue above-mentioned treatment for 1 to 5 hours at a temperature of 30°C to 40°C. This treatment is effective to prepare 2,5-bis(3,4-dicarboxyphenyl)-1,3,4-oxadiazole (hereinafter referred to as "ODTA") particularly from trimellitic anhydride and hydrazine.

Tetracarboxylic acid expressed by the general formula (III) which is obtained by the method of this invention can be easily converted into di-anhydride expressed by the general formula (IV) by ordinary dehydration, for example, thermally dehydrating said tetracarboxylic acid in a solid state or effecting said dehydration in acetic anhydride. Both products have high purity and are useful as raw materials for heat-resisting resins.

The di-anhydride prepared by this invention and expressed by the general formula (IV) and di-anhydride obtained by dehydrating the tetracarboxylic acid prepared by this invention and expressed by the general formula (III) can be made far purer, if necessary. This purification can be attained by washing or recrystallizing the di-anhydride using dioxane, or a amide- or sulfoxide-series solvent such as dimethyl formamide, dimethyl acetamide, N-methyl pyrrolidone or dimethyl sulfoxide.

This invention will be more fully understood by reference to the examples which follow. Throughout the examples and controls, parts denote parts by weight. The purity of tetracarboxylic acid obtained in the examples is represented by that of di-anhydride converted therefrom by its dehydration at 220°C for 5 hours. The purity of this di-anhydride was determined by measuring its acid equivalent.

EXAMPLE 1

A three necked flask provided with a thermometer, agitator and calcium chloride-filled glass tube was charged with 1063 parts of trimellitic anhydride and 2,560 parts of fuming sulfuric acid containing 60 per cent by weight of free $SO_3$. While the mixture was stirred, 330 parts of hydrazine sulfate was added. The whole mass was stirred for 3 hours with the temperature maintained at 90°C for reaction between the trimellitic anhydride and hydrazine sulfate. After completion of reaction, the mixture containing the reaction product was cooled to room temperature, and slowly poured on 5,120 parts of ice to precipitate white solids. The solids were filtered out of the resultant suspension and washed four times, each time with 1,400 parts of water, followed by drying at 130°C, obtaining 939 parts of white solids. Infrared analysis showed that the product was 2,5-bis (3,4-dicarboxyphenyl)-1,3,4-oxadiazole (ODTA). This ODTA had a purity of 93.2 percent and was produced with a yield of 93.0 mol percent based on the raw hydrazine sulfate. The purity of said ODTA is represented by the measured acid value of di-anhydride (ODDA) obtained by dehydrating said ODTA for 5 hours at a temperature of 220°C.

CONTROL 1

ODTA was prepared in the same manner as in Example 1, except that there was used 6150 parts of fuming sulfuric acid containing 25 per cent by weight of free $SO_3$. As the result, there was obtained 762 parts (a yield of 77 mol percent) of ODTA having a purity of 62.7 percent.

EXAMPLE 2

In order to study the separation and precipitation, under varied conditions, of the reaction product from the mixture containing the reaction product, the undermentioned experiments were made. The mixture containing the reaction product used in each experiment was prepared by the following method.

1. Preparation of mixture containing reaction product.

The same type of reactor as used in Example 1 was charged with 142 parts of trimellitic anhydride, 305 parts of fuming sulfuric acid containing 67 per cent by weight of free $SO_3$ and 44 parts of hydrazine sulfate. With stirring, reaction between trimellitic anhydride and hydrazine sulfate was continued for 1 hour with the temperature maintained at 85°C and then for two more hours with the temperature raised to 90°C. After completion of reaction, the mixture containing the reaction product was cooled to room temperature.

2. Separation and precipitation of reaction product.

Each mixture containing reaction product prepared by the above method was made into eight different kinds of suspension whose sulfuric acid concentrations are as shown in Table 1 by pouring into it slowly ice or ice water shown in Table 1. Each suspension was then stirred gently for the specified length of time at the temperature shown in Table 1. Thereafter solids were filtered out of the suspension and washed five times, each time with 200 parts of water. The solids were dried for 5 hours at 130°C to obtain ODTA. Table 1 also shows the yield and the purity of ODTA produced by each process. In the table, "unsatisfactory" in the case of washing means that the solids obtained by separation and precipitation of the mixture turned paste-like during washing, reducing the case of washing in production of ODTA.

Table 1

| Experiment | Quantity of ice or ice water (parts)/ Sulfuric acid concentration (%) | Time (min)/ Temperature (%) | Ease of washing | Yield (mol%)/ Purity (%) |
|---|---|---|---|---|
| 1 | 800/31 | 0/30-40 | unsatisfactory | 88/91.5 |
| 2 | 800/31 | 60/30-40 | satisfactory | 95/92.4 |
| 3 | 800/31 | 420/30-40 | satisfactory | 93/91.8 |
| 4 | 380/50 | 60/30-40 | satisfactory | 88/90.3 |
| 5 | 800/31 | 60/60-70 | satisfactory | 89/89.2 |
| 6 | 380/50 | 20/60-70 | unsatisfactory | 88/89.5 |
| 7 | 800/31 | 60/10-20 | unsatisfactory | 88/91.5 |
| 8 | 3200/10 | 60/30-40 | satisfactory | 85/91.6 |

As is evident from Table 1, 1. when the time of stirring the suspension was less than 30 minutes or when the temperature of the suspension at the time of stirring was lower than 20°C, the water-washing of the reaction product was not easy though they had not much adverse effect on the purity and yield of ODTA produced, and
2. when the sulfuric acid concentration of the suspension was not within the range of 15–45 percent or when its temperature was higher than 60°C at the time of stirring, no higher purity and yield of ODTA were obtained than those of ODTA produced in Experiment 1 in which solids were promptly filtered out of the suspension.

EXAMPLE 3

The same type of reactor as used in Example 1 was charged with 284 parts of trimellitic anhydride, 744 parts of fuming sulfuric acid containing 60 per cent by weight of free $SO_3$ and 88 parts of hydrazine sulfate, reaction being carried out in the same manner as in Example 2. 250 parts of the mixture containing the reaction product was weighed out, poured on 330 parts of ice and stirred for 2 hours with the temperature maintained at 40°C. Solids were filtered out of the resultant suspension and washed five times, each time with 100 parts of water, followed by drying, obtaining ODTA. This ODTA was produced with a yield of 93.0 mol percent based on the raw hydrazine sulfate and had a purity of 92.5 percent as measured in the same manner as in Example 1.

EXAMPLE 4

ODTA was prepared in the same manner as in Example 1, except that reaction was carried out for 3 hours at a temperature of 105°C using 5,000 parts of fuming sulfuric acid containing 45 percent by weight of free $SO_3$. The mixture containing the reaction product was poured on 10,000 parts of ice. Solids thus precipitated were washed four times, each time with 1350 parts of water, followed by drying, obtaining 854 parts of white ODTA. This ODTA was produced with a yield of 84.6 percent based on the raw hydrazine sulfate and had a purity of 91.0 percent as measured in the same manner as in Example 1.

EXAMPLE 5

The same type of reactor as used in Example 1 was charged with 420 parts of trimellitic anhydride and 2200 parts of fuming sulfuric acid containing 50 percent by weight of free $SO_3$. While the mass was maintained at a temperature of 90°C with stirring, 194 parts of isophthalic dihydrazide was slowly added. Reaction was carried out for 3 hours at said temperature and for 1 more hour at a temperature of 110°C. The mixture containing the reaction product was cooled to room temperature, and slowly poured with stirring into 4,000 parts of iced water to precipitate the reaction product. The product was filtered out after the resultant suspension was stirred for 30 minutes at 50°C. Light yellow solids thus filtered were fully washed, followed by drying at 130°C, obtaining 455 parts of powdery solids with a yield of 84 mol percent based on the raw isophthalic dihydrazide. The solids decomposed without indicating any particular melting point and had on acid value of 398 (a theoretic value is 414). When analyzed by an infrared absorption spectrum, the solids did not show the absorption of an imide ring or phthalazine-dione ring, thus proving that they were tetracarboxylic acid expressed by the general formula:

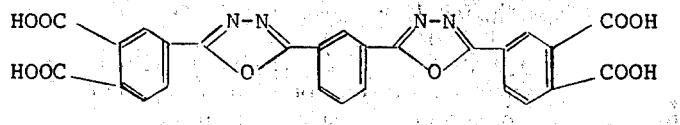

EXAMPLES 6 to 8

Reaction was carried out using the raw materials listed in Table 1 below under the reaction conditions described therein. The mixture containing the reaction product was treated in the same manner as in Example 5, obtaining the desired tetracarboxylic acid. The chemical structures of the reaction products were determined from the acid values, infrared spectra and ultimate analysis, the results being also presented in Table 2.

furic acid containing 25 percent by weight of free $SO_3$. The product had an acid value of 290 and, when analyzed by an infrared absorption spectrum, was found to contain a phthalazine-dione ring.

EXAMPLE 9

A reaction product obtained by reacting the same materials under the same conditions as shown in Example 1, cooled to the room temperature, was poured into 8000 parts of acetone being cooled with ice water from outside, thereby precipitating it into white solids. The solids were filtered out of the resultant suspension, washed with acetone, and dried at 130°C. As a result 725 parts of 2,5-bis (3,4-dicarboxyphenyl)-1,3,4-oxadiazole (ODDA) was obtained. This ODDA had a Table 2

| Example | Kind and amount of $R_2$ contained in dihydrazide | Kind and amount of $R_1$ contained in tricarboxylic anhydride | Concentration of free $SO_3$ contained in fuming sulfuric acid/amount of fuming sulfuric acid |
|---|---|---|---|
| 6 | ⟨◯⟩-O-⟨◯⟩- 143 parts | -⟨◯⟩- 192 parts | 45%/1650 parts |
| 7 | ⟨◯⟩- 96 parts | -⟨◯⟩-CO-⟨◯⟩- 296 parts | 60%/1300 parts |
| 8 | -⟨◯⟩-CO-⟨◯⟩- 149 parts | -⟨◯⟩- 192 parts | 60%/1700 parts |

| Example | Reaction temperature/ reaction time | Acid value/ yield of product | Reaction product expressed by the general formula |
|---|---|---|---|
| 6 | 80°C/ 3 hrs | 336/87% | HOOC-⟨◯⟩-(N-N/O)-⟨◯⟩-O-⟨◯⟩-(N-N/O)-⟨◯⟩-COOH, COOH (theoretic acid value 354) |
| 7 | 85°C/ 4 hrs | 290/93% | HOOC-⟨◯⟩-C(O)-⟨◯⟩-(N-N/O)-⟨◯⟩-(N-N/O)-⟨◯⟩-C(O)-⟨◯⟩-COOH, COOH (theoretic acid value 299) |
| 8 | 90°C/ 3 hrs | 330/92% | HOOC-⟨◯⟩-(N-N/O)-⟨◯⟩-C(O)-⟨◯⟩-(N-N/O)-⟨◯⟩-COOH, COOH (theoretic acid value 347) |

CONTROL 2

420 parts of light yellow powders were obtained with a yield of 77.5 mol percent based on the raw isophthalic dihydrazide in the same manner as in Example 5, except that there was used 4,800 parts of fuming sulpurity of 87.3 percent and was produced with a yield of 79 mol percent based on the raw hydrazine sulfate.

What we claim is:

1. A method of preparing aromatic tetracarboxylic acid containing oxadiazole ring or dianhydride thereof which comprises the steps of reacting tricarboxylic anhydride expressed by the formula:

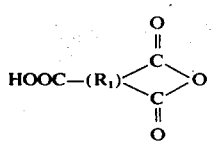

where $R_1$ denotes a member selected from the group consisting of the following radicals:

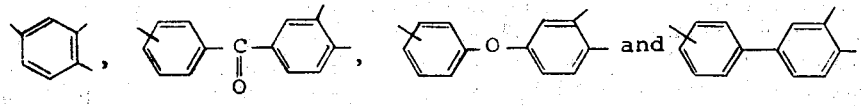

and amino compound selected from the group consisting of hydrazine or dihydrazides expressed by the formula:

$$H_2NHNC-(R_2)-CNHNH_2$$
$$\overset{O}{\underset{\|}{}} \quad \overset{O}{\underset{\|}{}}$$

where $R_2$ denotes a member selected from the group consisting of the following radicals:

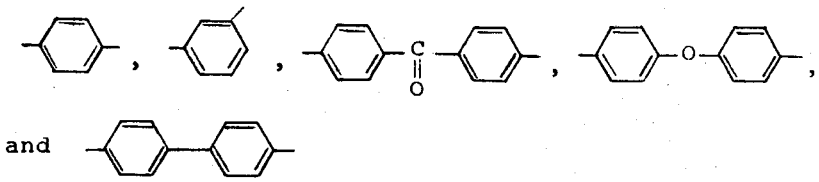

and the inorganic salts thereof at a higher temperature than 60°C in excess of the stoichiometric equivalent of fuming sulfuric acid containing more than 40 percent by weight of free $SO_3$, and thereafter precipitating the reaction product using a substance miscible with the sulfuric acid which acts as a nonsolvent with respect to said product selected from the group consisting of water, acetone, glacial acetic acid and acetic anhydride.

2. A method according to claim 1, wherein there is used fuming sulfuric acid containing 50 to 70 per cent by weight of free $SO_3$.

3. A method according to claim 1, wherein the reaction temperature is 80° to 100°C.

4. A method according to claim 1, wherein the reaction is carried out with the molar ratio of the free $SO_3$ to the hydrazine set at more than 6.

5. A method according to claim 1, wherein the reaction is carried out with the molar ratio of the free $SO_3$ to the dihydrazide set at more than 8.

6. A method according to claim 1, wherein the reaction is carried out with the molar ratio of the tricarboxylic anhydride to the amino compound chosen to fall within the range of 1.8:1 to 2.6:1.

7. A method according to claim 1, wherein tricarboxylic anhydride is first dissolved in fuming sulfuric acid and then amino compound is added thereto to be reacted with said tricarboxylic anhydride.

8. A method according to claim 1, wherein the tricarboxylic anhydride is trimellitic anhydride.

9. A method according to claim 1, wherein the amino compound is selected from the group consisting of hydrazine, terephthalic dihydrazide, isophthalic dihydrazide and the salts thereof.

10. A method according to claim 1, wherein the amino compound is an inorganic salt of hydrazine.

11. A method according to claim 1, wherein water is added to the fuming sulfuric acid solution containing the reaction product for precipitation of the reaction product so as to bring the concentration of sulfuric acid to 15 to 45 per cent by weight, the resultant suspension is maintained at a temperature of 20° to 60°C for more than 30 minutes and then the reaction product is separated.

12. A method according to claim 11, wherein the reaction product is separated after the suspension is maintained at a temperature of 30° to 40°C for 1 to 5 hours.

13. The method of claim 1 wherein said substance miscible with sulfuric acid is water and tetracarboxylic acid is precipitated.

14. The method of claim 1 wherein said substance miscible with sulfuric acid is acetone, glacial acetic acid or acetic anhydride and dianhydride of tetracarboxylic acid is precipitated.

* * * * *